3,399,180
POLYMERS OF HALOGENATED
NITROSOALKANES
George H. Crawford, Jr., White Bear Lake, Minn., assignor to Minnesota Mining & Manufacturing Company, St. Paul, Minn., a corporation of Delaware
No Drawing. Filed May 18, 1959, Ser. No. 813,639
14 Claims. (Cl. 260—92.1)

This invention relates to new and useful fluorine-containing polymers, essentially linear in structure, having improved properties and to a method for the preparation thereof. In one aspect this invention relates to new and valuable high molecular weight fluorine-containing resinous thermoplastics and elastomers. In another aspect this invention relates to a new rubber useful for coating surfaces and fabrics to be used under corrosive conditions.

D. A. Barr and R. N. Haszeldine have published a disclosure on the reaction of trifluoronitrosomethane with tetrafluoroethylene to produce liquids (Journal of The Chemical Society, year 1955, page No. 1881). The authors considered this reaction to be ionic (anionic) since only liquids were produced and the reaction occurred in the dark at low temperatures in the absence of an added catalyst or promoter (Barr & Haszeldine, Nature, June 4, 1955, page 991). As an ionic type reaction, lower temperatures or aqueous emulsion systems would not lead to the production of higher molecular weight products. No use of the liquid was disclosed by Barr and Haszeldine. This liquid apparently had no known uses and its properties did not suggest any uses. On the other hand, the polymer of the present invention is a solid having certain physical properties which makes the polymer exceptionally useful for various uses as will be hereinafter described.

It is an object of this invention to provide new and useful fluorine-containing polymers.

It is another object of this invention to provide a process for the production of solid essentially linear polymers in contrast to liquid low molecular weight polymers, cross-linked polymers, and graft polymers.

Another object of this invention is to provide new fluorine-containing linear polymers which can be fabricated into various useful objects and articles of manufacture.

Still another object is to provide a new method for making chemical compounds, such as monomers.

Another object is to provide an aqueous latex of polymers of nitrosoalkanes.

Another object of this invention is to provide an elastomeric or rubbery high molecular weight linear polymer containing fluorine which is completely soluble in fluorine-containing halocarbons and which can be vulcanized.

Still another object of this invention is to provide a new surface coating.

It is still a further object of this invention to provide a fluorine-containing polymer which has good temperature and chemical stability and surprisingly good adhesive properties to surfaces, such as metal surfaces.

Various other objects and advantages of the present invention will become apparent to those skilled in the art from the accompanying description and disclosure.

According to the present invention, a fluorine-containing nitrosoalkane is copolymerized with an ethylenically unsaturated monolefin containing fluorine at a substantially constant temperature to produce directly a high molecular weight solid essentially linear copolymer. The solid linear copolymer of the present invention has an average molecular weight above 50,000, and generally above 100,000 and as high as 150,000 and 200,000, or higher. The copolymer of the present invention is either a thermoplastic or elastomeric material depending upon the conditions of polymerization and the monomers employed. Both the elastomeric and thermoplastic copolymer are insoluble in hydrocarbon solvents but the elastomer is completely soluble in fluorinated hydrocarbons. The polymers of this invention are thermally stable up to about 200° C. The proportion of the monomeric units in the final polymer vary between about 25 and about 75 mol percent for each of the components. Usually the copolymer is a 1:1 polymer.

The fluorine-containing nitrosoalkane monomeric material of the present invention is perhalogenated in which the halogens are normally gaseous halogens and preferably the nitrosoalkane contains less than 13 carbon atoms per molecule and is a mononitrosoalkane. Nitrosoalkanes of greater number of carbon atoms can be made and used as monomers without departing from the scope of this invention. Typical examples of the fluorine-containing nitrosoalkanes of the present invention include trifluoronitrosomethane, pentafluoronitrosoethane, heptafluoronitrosopropane, nitrosoperfluorobutane, nitrosoperfluorooctane, trifluorodichloronitrosoethane, 1-nitroso-1,3,5,7,7,7-hexachlorononafluoroheptane, and 1-nitroso-1,3,5,7,9,9,9-heptachlorododecafluorononane.

The mononitrosoalkanes are prepared by reacting a fluorine-containing alkyl halide of less than 13 carbon atoms, such as an alkyl bromide or an alkyl iodide, with nitric oxide in approximately equal molar ratios in the presence of mercury and ultraviolet light for about 24 hours to produce the corresponding nitrosoalkane. The use of the alkyl bromide for this reaction is unexpected because the bromine-carbon bond is more stable and stronger than the iodine-carbon bond. The use of the bromide is very desirable because it is much cheaper than the iodide. For example, trifluoromethylbromine is reacted with nitric oxide to produce trifluoronitrosomethane; pentafluoroethylbromide is reacted with nitric oxide to produce pentafluoronitrosoethane; and heptafluoropropylbromide or iodide is reacted with nitrous oxide to produce heptafluoronitrosopropane. Also, the chlorofluoronitrosoalkanes can be prepared from chlorotrifluoroethylene telomers of trichlorobromomethane in a similar manner.

A convenient empirical formula for representing the mononitroso compounds is R—NO where R is a perhalogenated alkyl radical containing fluorine on the carbon atom adjacent to the nitroso group, in which the other halogens are selected from the group consisting of chlorine and fluorine. Preferably, the alkyl radical has not more than 6 carbon atoms.

The comonomers with which the fluorine-containing nitroso compounds of this invention may be copolymerized are the polymerizable monoolefins having ethylenic unsaturation and not more than 8 carbon atoms per molecule. The monoolefin comonomers are preferably those which will homopolymerize under free radical mechanism. Preferably, the monoolefins have at least 2 halogen atoms per molecule, at least two of which are fluorine, and not more than 3 hydrogen atoms per molecule. Examples of the preferred fluorine-containing monoolefins include trifluoroethylene, difluoromonochloroethylene, tetrafluoroethylene, trifluorochloroethylene and unsymmetrical difluorodichloroethylene. Other monoolefin comonomers which will copolymerize with the nitrosoalkane include vinylidene chloride, vinylidene fluoride, styrene and the acrylates in which the carbons of the double bond bear halogens.

Various polymerization techniques may be utilized to copolymerize the monomers of the present invention to produce solid polymers. Accordingly, the polymerization may be carried out as a bulk polymerization in which the monomers are polymerized in a bomb under autogeneous pressure at temperatures below 10° C., preferably below 0° C. for a period of time of at least one-half hour to obtain 90 percent conversion to the solid polymer. Temperatures much above 25° C. in the bulk system result in lower molecular weight waxy or oily product. The charge should utilize an excess of the nitroso monomer, and preferably at least a 2:1 mol excess of the nitroso monomer. It is desirable to maintain the temperature low and an excess of the nitroso monomer to assure production of solid polymer by the bulk polymerization system.

Surprisingly, it has also been found that the solid polymer can be produced by the use of the aqueous emulsion technique in which the monomers are emulsified in a water medium during polymerization. This technique may be carried out at substantially higher temperatures than the bulk system, and temperatures above 0° C. and as high as 50° C. may be employed and still result in the production of high molecular weight solid polymers. The use of an emulsifier and temperature increases the rate of reaction but does not result in lower molecular weight material. In the emulsion technique, the monomer charged may be in a 1:1 mol ratio or higher. Preferably, an excess of nitroso monomer is employed, such as a mol ratio of nitrosoalkane to comonomer of 2:1 or higher. It is important, however, in the emulsion technique that the emulsifier is substantially inert and does not act as a chain transfer agent. Many emulsifiers tend to cause production of low molecular weight material rather than the solid polymer either because they fail to sufficiently emulsify the mixture or act as chain transfer agents stopping the chain growth. It has been found that the perhalogenated alkanoic acids and salts are particularly good emulsifying agents. For example, the perfluorochloro and the perfluoroalkanoic acids having between about 6 and about 12 carbon atoms per molecule are suitable either in the acid form or in the alkali metal or ammonium salt form. A particularly suitable emulsifier is perfluorooctanoic acid or the potassium salt thereof.

Much to my surprise and contrary to the teachings of Haszeldine and Barr, supra, it has been found that the present copolymerization of the nitrosoalkane with a monoolefin proceeds through a free radical mechanism. Numerous experiments have demonstrated that the polymerization proceeds by this mechanism. For example, using conventional chain transfer agents in the polymerization results in a material decrease in molecular weight of the product. In other experiments, cationic catalysts were used, such as $TiCl_4$ and $BF_3$-etherate which are known to inhibit anionic reactions, and did not have any effect upon the molecular weight; this, therefore, would rule out an anionic reaction mechanism. Since the system works well with perhalogenated monomers, the cationic-type mechanism would also appear to be impossible. In fact, any ionic-type polymerization mechanism is known to be inhibited by aqueous systems; and since the present reaction can be effected readily in an aqueous emulsion system, it is clear that the type of reaction involved is a free radical mechanism even though no catalyst or promoter is utilized in the polymerization process. Most likely the nitroso group of the nitrosoalkane is freed in sufficient amount to act as a free radical promoter.

The above accounts for the fact that it is absolutely essential in the present system to provide pure and clean monomer in order to produce a solid high molecular weight copolymer of the present invention. The monomers themselves are made from materials which act as free radical promoters; for example, trifluoromethyliodide and trifluoromethylbromide. These latter compounds are noted as very active free radical chain transfer agents. Therefore, only by special care in purifying the monomers derived from these precursor materials was it possible to produce the high molecular weight polymer having an essentially linear structure. In general, the monomers should contain less than 1 weight percent of any impurities, such as trifluoromethylbromide, and preferably less than 0.5 weight percent impurities, particularly when the impurity may be trifluoromethyliodide. If the impurity content of the monomers exceeds the above values, the copolymer molecular weight is substantially below 50,000, usually around 7,000 to 15,000 molecular weight.

In order to obtain such a purified monomer of the nitrosoalkane, a packed distillation column of at least 70 theoretical plates should be used. For example, the use of a distillation column of 50 or less theoretical plates and of inefficient construction results in an impurity content as high as 20 weight percent.

The 1:1 copolymer may be represented by the following linear-type structure which has been substantiated by chemical analysis and nuclear magnetic resonance determination. The structure for the 1:1 copolymer using the mononitroso monomer is represented by the following:

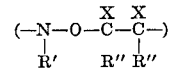

in which R' is the alkyl group of the nitrosoalkane and previously defined, and R'' is an alkyl group derived from the monoolefin or halogen or hydrogen; X is a halogen or hydrogen, and preferably X is fluorine or chlorine; and n is generally 250 to 1,000.

There is no evidence in the high molecular weight copolymer structure of cross-linking between copolymer chains by either of the monomers or monomer fragments. It is to be understood that the pendant alkyl groups of the monomeric units forming a part of the linear structure of the copolymer of this invention do not constitute chain branches. All of the monomeric units of the reaction appear to react to form a single type of polymeric structure, and there is no evidence that the high molecular weight properties of the present composition result from a mixture of a copolymer and a homopolymer of the monoolefin. The character and structure of the present high molecular weight composition have been substantiated by solubility test, nuclear magnetic resonance spectra, and elemental analysis.

The solid high molecular weight copolymers of the present invention are useful as sealants, adhesives and surface coatings such as for metal and glass surfaces. The polymer of the present invention can be coated on various surfaces directly from the latex produced in the emulsion system or the separated and dried polymer can be dissolved in a fluorocarbon or chlorofluorocarbon solvent and then coated on the surface. In the case of using the latex for coating of a surface, the deposited copolymer after evaporation of the aqueous medium of the latex forms a continuous homogeneous nonporous film on the surface with satisfactory adhesion thereto.

The solid rubbery copolymer of this invention may be preformed at temperatures above 150° C. into various articles, such as gaskets and O-rings, and vulcanized to produce stiffer and harder articles.

The following examples are offered as a better understanding of the various aspects of this invention and should not be construed as limiting the invention.

Example I

A 50/50 mol ratio charge of $CF_3Br$ (74.5 grams) and NO (15.0 grams) were agitated in the presence of mercury and ultraviolet light (2537 A.) for 24 hours. The pressure was maintained at about one atmosphere by intermittently charging NO as the pressure decreased. The product was distilled in a 35 inch long reflux column having 70 theoretical plates using aluminum turnings as packings and at a reflux temperature of about −84° C. to produce a 60 percent yield of trifluoronitrosomethane substantially free from $CF_3Br$ (less than 1 weight percent).

Example II 5 grams of $CF_3NO$ (made and purified as above) and 2.5 grams of $C_2F_4$ were charged to a 30 ml. Pyrex ampoule and agitated therein in the absence of a catalyst for 24 hours at −16° C. A 95–98% conversion was obtained based upon the $C_2F_4$ charged. The product was a rubbery high molecular weight polymer having an inherent viscosity of 0.45 corresponding to an average molecular weight of about 80,000 to 100,000. The polymer in the glass reactor was dissolved in $CF_2ClCFCl_2$ and removed from the reactor in solution (no insoluble residue).

Similar polymerizations as above at −40 and −65° C. yielded approximately identical products.

The copolymer product of the above run had the following physical and chemical properties:

$CF_3NO/C_2F_4$—gum-properties
$<n>$—inherent viscosity 0.45 gum rubber
Analysis (C, F, N)—indicates 1:1 comonomer ratio
Infrared—shows disappearance of N=O bond
N.M.R.—linear structure

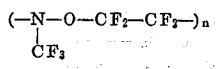

$Tg$ (by $n^d$)——−51° C.
24 hours swell A.S.T.M. Fluid II—2.1% (gum)
Gehman $T_{10}$——−38° C. (vulcanized stock)
Torsional modulus—40 p.s.i. (vulcanized stock)
Soluble—all fluorocarbons
Insoluble—common organic solvents (non-halogenated)
Thermally stable to 200° C.

Example III

Into a 30 ml. Pyrex ampoule which was designed for high pressure polymerization reactions were charged three grams of $CF_3NO$ (made and purified as in Example I) with 1.6 grams of chlorotrifluoroethylene. Here an excess of the nitroso monomer was employed. The reactor and contents were agitated at −16° C. for 2 hours during which time the solution became progressively more viscous. During an additional three hours, the reaction mixture and the apparent viscosity of reaction mixture had not increased further. The solution was still a bright blue color indicating that a considerable quantity of unreacted $CF_3NO$ remained. Upon opening the vessel two grams of $CF_3NO$ were recovered. A trace amount of high boiling liquid, assumed to be the cyclic adduct was detected. The polymer was a gum elastomer having an inherent viscosity of 0.532 (0.5% solution in perfluorohexane) corresponding to an average molecular weight of 110,000 to 130,000. Elemental analysis was as follows: 17.0% carbon, 52.4% fluorine, 5.8% nitrogen, indicating that the monomers had combined in 50/50 mol ratio.

Example IV

Into a steel bomb of 300 ml. capacity was charged 53.7 grams (0.54 mol) $CF_3NO$ which had been subjected to rigorous purification as in Example I along with 25 grams (0.30 mol) trifluoroethylene which had been freed by distillation and water washing of impurities likely to cause free radical chain transfer reactions. The reactor and contents were agitated six hours at room temperature during which time the pressure dropped from 300 p.s.i.g. to 0. The reactor was removed from the shaking apparatus and opened. The contents were dissolved from the reactor in Freon 113. Upon evaporation of the solvent, 52 grams of an elastomeric gum having an average molecular weight above 50,000 was obtained. Material balance indicated that a 1:1 copolymer had been formed.

Example V

Into a Pyrex ampoule of the type described in Example III were condensed 5.37 grams $CF_3NO$ and 3.6 grams of $CF_2=CCl_2$ corresponding to a 2:1 mol ratio. The $CF_3NO$ employed in this reaction had been recovered from earlier polymerizations, purified by fractional distillation as in Example I and water washed. Analysis indicated it to be free of free radical chain transfer agents. Trace amounts of such materials which may have been present in fresh monomer would be scavenged in the earlier polymerization. The ampoule and contents were polymerized in bulk at 0° C. The reaction went to completion in one hour. A quantitative yield of tough, short rubber having an average molecular weight of about 100,000 was obtained, based on amount of $CF_2=CCl_2$ charged. Unreacted $CF_3NO$ was recovered unchanged.

Example VI

Into a 10 cc. capacity Pyrex ampoule was charged 0.9 gram of purified $CF_2ClCFClNO$, B.P. about 40° C. (prepared as in Example I from $CF_2ClCFCll$) and 0.9 gram chlorotrifluoroethylene. The reactor and contents were allowed to stand 24 hours at a temperature of −16° C. At the end of this period no reaction was evident. The temperature was then raised to 23° C. and the reactor allowed to stand seven days. During this time, the disappearance of blue color indicated that a polymerization had occurred. The ampoule was opened and the volatile product removed. The residue was removed from the ampoule by washing with Freon 113. The product was a gum rubber having an average molecular weight above 50,000 whose nitrogen analysis was 3.7% indicating it to be a copolymer of the two constituents. 1.2 grams of polymeric product were obtained.

Example VII

Into a 10 cc. ampoule were placed 6 grams (.013 mol) of purified $C_8F_{17}NO$, 28° C./15 mm. Hg (prepared as in Example I from $C_8F_{17}I$), and 1.9 grams (.019 mol) tetrafluoroethylene. The reaction mixture was polymerized in bulk at room temperature for a 24 hour period. 7 grams of elastomeric polymer were obtained with the material balance indicating a 1:1 copolymer having been formed. The inherent viscosity was 0.651 indicating an average molecular weight considerably in excess of 100,000.

Example VIII

Into a 300 ml. stainless-steel autoclave containing $H_2O$, 100 grams; $K_2HPO_4$ (buffer), 2.5 grams; $C_7F_{15}COOK$, 2 grams maintained at 1° C. was charged $CF_3NO$, 20 grams (0.02 mol), and $C_2F_4$, 10 grams (0.10 mol). The $CF_3NO$ was purified by vigorously water washing to free it of oxides of nitrogen and $CO_2$, followed by careful fractionation to free it from starting materials which act as free radical chain transfer agents.

The reactor was agitated 8 hours at 0° C. The reactor was then vented. $CF_3NO$ (9.6 grams) was recovered as unreacted starting material. The vessel was found to contain a milky-white latex which was coagulated by freezing. The coagulum was an elastomeric gum which was washed free of emulsifier, etc. by means of cold methanol. The gum was dissolved in Freon 113 ($CF_2ClCFCl_2$) and filtered as a means of further purification.

The polymer was found to have an inherent viscosity (0.5% in perfluorohexane) of 0.410 which corresponds roughly to a molecular weight of 80,000 to 100,000. Elemental analysis was as follows: C, 18.2%; F, 65.9%; N, 6.66% corresponding to a 50/50 combined mol ratio. 18.5 grams (92.9% based on $C_2F_4$ charged) high polymer were obtained.

Example IX

Into a 300 ml. stainless-steel autoclave containing $H_2O$, 150 grams; $K_2HPO_4$ (buffer), 3 grams; $K_2S_2O_8$ (added catalyst), 0.15 gram; $C_7F_{15}COONH_4$, 3.0 grams were charged $CF_3NO$, 25 grams (0.25 mol) and $C_2F_4$, 25 grams (0.25 mol). The reactor was agitated 4 hours at 20–23° C. Unreacted monomers (18 grams) were recovered and used in subsequent polymerizations. The reactor was found to contain a creamy latex along with some pre-coagulated material. The contents of the reactor were worked up as in Example VIII. 28.5 grams (57% conversion) of elastomeric gum $<n>$=.302 were obtained indicating an average molecular weight substantially above 50,000. Elemental analysis (N=6.31%) confirmed that a 50/50 copolymer had been obtained.

Example X

Into a 30 cc. Pyrex ampoule containing the free radical emulsion recipe described in Example IX were placed 5.6 grams of purified $C_2F_5NO$, B.P. $-42°$ C. (prepared as in Example I from $C_2F_5I$), and 1.9 grams of tetrafluoroethylene. The reactor and contents were agitated 4 hours at 25° C. The reactor was then opened and the contents removed. The polymer was worked up as in Example IX. 4.7 grams representing a quantitative yield based on tetrafluoroethylene charge of an elastomeric gum were obtained. This polymer had an inherent viscosity of 0.324 indicating it to be in the high polymer having an average molecular weight above 50,000.

Example XI 3.25 grams (0.016 mol) $C_3F_7NO$, B.P. $-12°$ C., was condensed into a 30 ml. Pyrex ampoule containing perfluorinated $C_6$ cyclic ether (15 cc.). This ampoule was equipped for constant pressure comonomer feed, having an inlet tube placed below the surface of the above solution, and with provision for magnetic stirring, and maintained at any desired temperature. Tetrafluoroethylene was fed intermittently into this apparatus at 100–120 p.s.i. through a diaphragm regulator, while maintaining the reaction mixture at 0° C. Thus, of monomers present, the $C_3F_7NO$ was always in excess. After 20 hours of running time, the blue color of $C_3F_7NO$ had disappeared. On opening the tube and evaporating the solvent 4.5 grams (92%) of elastomeric gum were obtained. The inherent viscosity was $<n>=0.38$ which corresponded to an average molecular weight of about 70,000 to 90,000.

Example XII

Into a high pressure 30 ml. Pyrex ampoule were condensed 5.6 grams (.056 mol) $C_2F_4$ and 1.4 grams (.0141 mol) highly purified $CF_3NO$. The reactor and contents were warmed to 22° C., then irradiated 6 hours (2537 A.). All color disappeared. 3.1 grams of a waxy solid polymer were obtained. This material was found to be separable into soluble and insoluble components, 44.4% soluble and 55.6% insoluble in perfluorinated $C_6$ cyclic ether. The former contained 6.3% N, corresponding to a 50/50 combined mol ratio. The insoluble material, a thermoplastic, was found by infrared analysis to be a copolymer of $C_2F_4$ and $CF_3NO$ in which $C_2F_4$ was present in a major proportion. The latter polymer had a molecular weight in excess of 200,000.

Example XIII

Into a Pyrex ampoule of the type of Example III were charged 4.48 grams vinylidene fluoride and 6.9 grams $CF_3NO$ corresponding to a 50/50 mol ratio. The reactor and contents were allowed to stand at room temperature for a three-week period during which time the characteristic blue color of $CF_3NO$ slowly disappeared. A viscous oil was obtained as the immediate product, which was then distilled. During distillation decomposition occurred liberating HF and giving rise to a volatile liquid boiling between 40 and 50° C. The pot residue was a heavy wax having an average molecular weight above 50,000. Infrared analysis of this wax indicated it to be a polymer of vinylidene fluoride and $CF_3NO$ in which considerable chain unsaturation was present. Elemental analysis showed 42.8% fluorine, 11.9% nitrogen and 28.0% carbon. This, along with the other data, indicated that the elements of hydrogen fluoride had been lost from the backbone giving rise to an unsaturated polymer. This material was capable of vulcanization by conventional vulcanization agents to a hard stiff product.

The effect of temperature on molecular weight is not very pronounced. In bulk polymerization the optimum of temperature is $-25$ to 0° C. If the temperature is lowered below $-25°$ C. in the bulk polymerization, the rate of polymerization decreases rapidly and at $-65°$ C. four or five days are required to reach a 50 percent conversion to produce a high molecular weight polymer. On the other hand, at $-25°$ C. an 80 to 90 percent yield of high molecular weight polymer is obtained in about three hours. No added catalyst or promoter is necessary in the bulk system, but any of the conventional bulk polymerization catalysts may be used without departing from the scope of this invention.

In the emulsion system, the optimum temperature is between about 0 and about 25° C. In the emulsion-type polymerization, the molecular weight is slightly higher than with the bulk polymerization at the same temperature. In the emulsion polymerization a reducing agent, such as a bisulfite, is unnecessary; but an inorganic peroxide promoter or catalyst, such as an alkali persulfate, perphosphate, perborate, etc., may be added, if desired. Somewhat higher molecular weight is achieved by the addition of a catalyst in the aqueous system and is thus preferred, but high polymer can be made without the addition of a catalyst. Acidic emulsion recipes give preflocculation of polymer while basic emulsion recipes give a polymer latex. Solution polymerizations may also be used in the present invention in which an inert solvent, such as perfluorooctane, is used as the solvent, and the results are similar to the bulk polymerization.

The mechanism of polymerization of the present invention has been determined to be the free radical-type mechanism. Deliberate addition of chain transfer or terminating agents, such as $CF_3CH_2I$ and 1,1,1,2-tetrachloroethane, or $CF_3I$, to the polymerization mixture resulted in a drastic reduction of the molecular weight, producing an oily product. Runs of this nature using chain transfer agents have produced an oil having an inherent viscosity of 0.061 which corresponds to molecular weight of about 10,000.

It is know that such compounds as isobutylene, styrene, methyl styrene, butadiene, and vinyl alkyl ethers in which the double bond substituents all have strong electron-releasing characteristics are those which enter into polymerizations of the cationic type. The $\pi$ electrons must be readily available for sharing with an electrophilic reagent. Since the opposite is true of highly halogen-substituted monomers and since any mechanism depending upon the formation and existence of a fluorocarbon carbonium ion as a propagating site is impossible, cationic mechanism of the present copolymerization system is not possible as a mechanism of reaction.

In the anionic mechanism of reaction, initiation is by reagents capable of generating carbanions, e.g., reagents as alkali metals, metal alkyls and $KNH_2$. The propagating center is a carbanion. Termination is by reaction with a gegen ion or by proton transfer. Thus, any strong electron acceptor, such as the Lewis acids, $BF_3$ etherate or $TiCl_4$, would be expected to destroy propagating centers and instantly kill the polymerization. Runs have been made using such electron acceptors, and it has been found that the electron acceptors have no effect upon the copolymerization of the nitrosoalkane with the monoolefins of this invention. Carbon dioxide has been demonstrated to cause prompt cessation of an anionic polymerization. Copolymerizations of the present invention have been conducted in the presence of $CO_2$ without deleterious effect. Moreover, anionic systems are not adaptable to aqueous emulsion techniques. Therefore, the present mechanism cannot be an anionic.

Under the above reasoning, the evidence indicates clearly that the present system is a free radical-type of reaction which may be illustrated by the following equations:

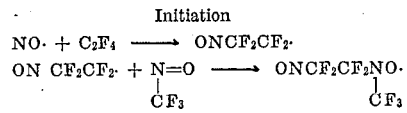

Propagation $$ONCF_2CF_2NO\cdot + CF_2=CF_2 \longrightarrow ONCF_2CF_2NOCF_2CF_2\cdot$$
$$\quad\quad\quad |\quad\quad\quad\quad\quad\quad\quad\quad\quad\quad\quad\quad\quad |$$
$$\quad\quad CF_3\quad\quad\quad\quad\quad\quad\quad\quad\quad\quad\quad CF_3$$

$$ONCF_2CF_2\left[NOCF_2CF_2\right]_n\cdot + N=O \longrightarrow etc.$$
$$\quad\quad\quad\quad\quad |\quad\quad\quad\quad\quad\quad |$$
$$\quad\quad\quad\quad CF_3\quad\quad\quad\quad CF_3$$

Termination $$2\ ON\ NOCF_2CF_2\cdot \longrightarrow ON\ NOCF_2CF_2:CF_2CF_2ON\ NO$$
$$\quad\quad |\quad\quad\quad\quad\quad\quad\quad\quad |\quad\quad\quad\quad\quad\quad\quad\quad |$$
$$\quad CF_3\quad\quad\quad\quad\quad\quad\quad CF_3\quad\quad\quad\quad\quad\quad CF_3$$

or $$ON\ NOCF_2CF_2\cdot + \cdot ONCF_2CF_2\ NO \longrightarrow$$
$$\quad |\quad\quad\quad\quad\quad\quad |$$
$$CF_3\quad\quad\quad\quad\ CF_3$$
$$\quad\quad\quad\quad\quad\quad ON\ NOCF_2CF_2ONCF_2CF_2\ NO$$
$$\quad\quad\quad\quad\quad\quad\quad\quad CF_3\quad\quad\quad\quad CF_3$$

or $$ON\ NOCF_2CF_2\cdot + R_fX \longrightarrow NCF_2CF_2X + R_f\cdot$$
$$\quad |\quad\quad\quad\quad\quad\quad\quad\quad\quad\quad\quad\quad\quad |$$
$$CF_3\quad\quad\quad\quad\quad\quad\quad\quad\quad\quad\quad CF_3$$

I have shown experimentally the odd-electron molecule, ·NO, to be capable of adding itself to fluorocarbon olefins. This reaction occurs in the dark without any catalyst and proceeds in a manner similar to the present copolymerization system. Therefore, it is believed that the odd-electron of nitric oxide causes it to behave as a free radical in the present system. The nitric oxide "radical" may be present initially as a trace impurity or may arise from slow homolytic cleavage of the nitrosoalkane.

In a system free of the aforementioned contaminants capable of chain transfer, termination is assumed to occur by the coupling reactions:

$$2\ CF_2CF_2\cdot \longrightarrow CF_2CF_2:CF_2CF_2$$

or $$CF_2CF_2\cdot + \cdot ON \longrightarrow CF_2CF_2:ON$$
$$\quad\quad\quad\quad\quad |\quad\quad\quad\quad\quad\quad\quad |$$
$$\quad\quad\quad\quad\ CF_3\quad\quad\quad\quad\quad\ CF_3$$

The reaction $$2\ NO\cdot \longrightarrow NO:ON$$
$$\quad |\quad\quad\quad\quad\quad |$$
$$CF_3\quad\quad\quad CF_3CF_3$$

being ruled out as giving an unstable product. Thus, any conditions favoring a high concentration of $CF_2CF_2\cdot$ will favor termination. Assuming steady-state conditions, an increase in $C_2F_4$ level in the reaction mixture will result in an increase in the concentration of $CF_2CF_2\cdot$ and an increase in the termination rate. Experimental runs have indicated this to be the effect of excess monoolefins, such as tetrafluoroethylene. For this reason, the proportion of the nitrosoalkane should be at least 1:1 with relation to the monoolefin and preferably in excess of the monoolefin. The preferred ratio of nitrosoalkane to monoolefin is at least 2:1.

Various modifications and alterations of the teachings of the present invention may become obvious to those skilled in the art without departing from the scope thereof. Having proved the mechanism of reaction to be free radical, it will also become apparent that the combination of other monomers with nitrosoalkane containing substantial fluorine substitution under appropriate conditions of reaction as taught herein may be used to produce high molecular weight copolymers.

Having described my invention, I claim:

1. A method for making a high molecular weight polymer of a nitrosoalkane which comprises copolymerizing a fluorine-containing nitrosoalkane having less than 13 carbon atoms per molecule and of at least 99% purity with an ethylenically unsaturated monoolefin at a substantially constant temperature between about −65° C. and about 50° C. to produce a completely perfluorocarbon solvent soluble high molecular weight wholly linear copolymer of at least 50,000 molecular weight.

2. The process of claim 1 in which said copolymerization is carried out in an aqueous emulsion at a temperature between about 0° C. and about 50° C.

3. The process of claim 1 in which said copolymerization is carried out in a non-aqueous bulk system at a temperature below 0° C. but not less than −65° C.

4. A method for making a high molecular weight linear copolymer of a nitrosoalkane which comprises copolymerizing a perfluorinated nitrosoalkane having less than 13 carbon atoms per molecule and at least 99% purity with an ethylenically unsaturated fluorine-containing monoolefin at a substantially constant temperature between about −65° C. and about 50° C. to produce a completely perfluorocarbon solvent soluble high molecular weight wholly linear copolymer of at least 50,000 molecular weight.

5. The method of claim 4 in which said nitrosoalkane is trifluoronitrosomethane and said monoolefin is tetrafluoroethylene.

6. A completely perfluorocarbon solvent soluble solid high molecular weight wholly linear copolymer of a fluorine-containing nitrosoalkane having less than 13 carbon atoms per molecule and an ethylenically unsaturated monoolefin, said molecular weight being at least 50,000.

7. A completely perfluorocarbon solvent soluble solid high molecular weight wholly linear copolymer of a fluorine-containing perhalogenated nitrosoalkane having less than 13 carbon atoms per molecule and a fluorine-containing ethylene, said molecular weight being at least 50,000.

8. A completely perfluorocarbon solvent soluble elastomeric high molecular weight wholly linear copolymer of pentafluoronitrosoethane and tetrafluoroethylene, said molecular weight being at least 50,000.

9. A completely perfluorocarbon solvent soluble elastomeric high molecular weight wholly linear copolymer of heptafluoronitrosopropane and ethylene, said molecular weight being at least 50,000.

10. A completely perfluorocarbon solvent soluble elastomeric high molecular weight wholly linear copolymer of trifluoronitrosomethane and trifluorochloroethylene, said molecular weight being at least 50,000.

11. A completely perfluorocarbon solvent soluble elastomeric high molecular weight wholly linear copolymer of trifluoronitrosomethane and tetrafluoroethylene, said molecular weight being at least 50,000.

12. A completely perfluorocarbon solvent soluble elastomeric high molecular weight wholly linear copolymer of trifluoronitrosomethane and difluorodichloroethylene, said molecular weight being at least 50,000.

13. A completely perfluorocarbon solvent soluble elastomeric high molecular weight wholly linear copolymer of trifluoronitrosomethane and tetrafluoroethylene, said molecular weight being at least 50,000.

14. A solid, linear, rubbery copolymer of perfluoronitrosomethane and difluoroethylene said copolymer being thermally stable at 200° C.

References Cited

UNITED STATES PATENTS

| | | | |
|---|---|---|---|
| 2,322,308 | 6/1943 | Moyer | 260—647 |
| 2,419,976 | 5/1947 | Trepagnier et al. | 260—647 |
| 2,635,093 | 4/1953 | Miller et al. | 260—92.1 |
| 2,837,505 | 6/1958 | Dittman et al. | 260—92.1 |

FOREIGN PATENTS

| | | |
|---|---|---|
| 1,159,935 | 7/1958 | France. |
| 789,254 | 1/1958 | Great Britain. |

OTHER REFERENCES

Bar et al.: J. Chem. Soc. (London) 1955, 1881–89, Apr. 1955.

Haszeldine: Chem. & Eng. News, vol. 37, page 40, Aug. 1959.

JOSEPH L. SCHOFER, *Primary Examiner.*

HARRY WONG, JR., *Assistant Examiner.*

UNITED STATES PATENT OFFICE
CERTIFICATE OF CORRECTION

Patent No. 3,399,180                                     August 27, 1968

George H. Crawford, Jr.

It is certified that error appears in the above identified patent and that said Letters Patent are hereby corrected as shown below:

Column 2, line 37, "nitrous" should read -- nitric --.
Column 6, line 40, "(0.02 mole)" should read -- (0.20 mole) --.
Column 9, lines 7 to 19 should appear as shown below:

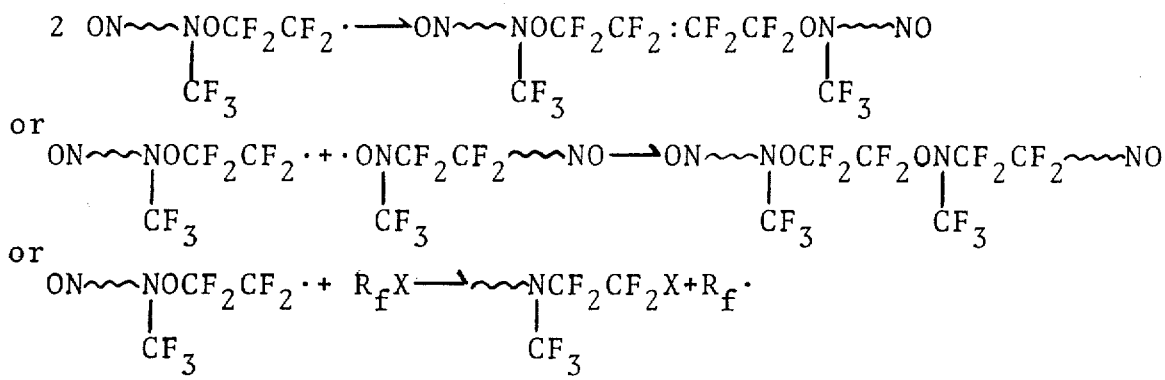

same column 9, lines 32 to 40 should appear as shown below:

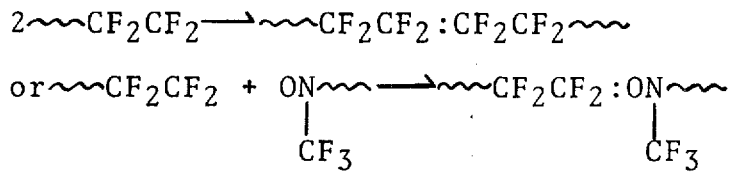

The reaction 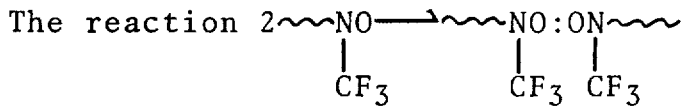

same column 9, lines 42 and 45, "of $CF_2CF_2$·", each occurrence, should read -- of∼∼$CF_2CF_2$· --. Column 10, line 34, "ethylene" should read -- tetrafluoroethylene --.

Signed and sealed this 10th day of March 1970.

(SEAL)
Attest:

EDWARD M. FLETCHER, JR.                          WILLIAM E. SCHUYLER, JR.
Attesting Officer                                        Commissioner of Patents